UNITED STATES PATENT OFFICE.

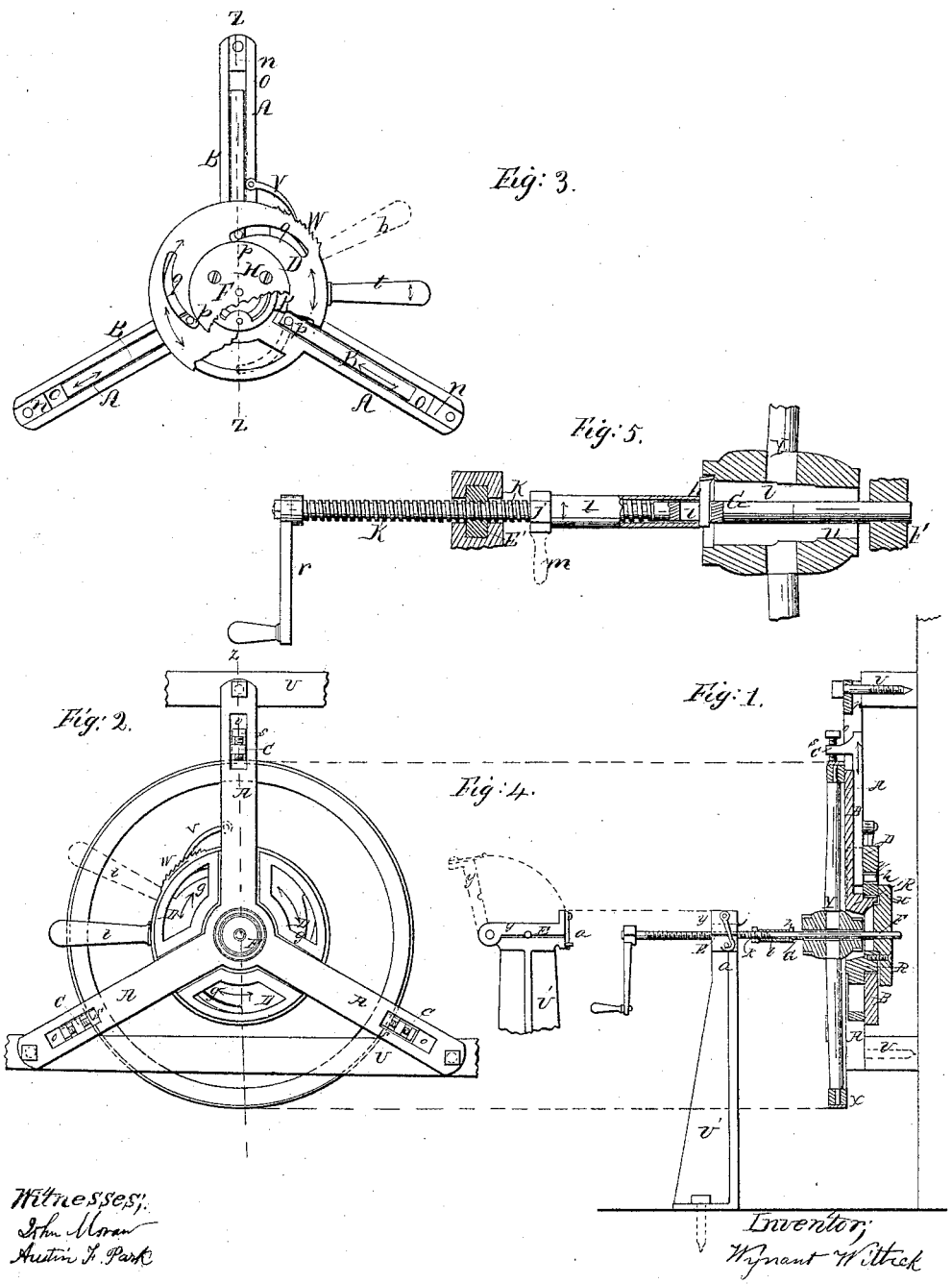

WYNANT WITBECK, OF TROY, NEW YORK.

IMPROVEMENT IN BOX-SETTERS FOR CARRIAGE-WHEELS.

Specification forming part of Letters Patent No. 59,495, dated November 6, 1866.

*To all whom it may concern:*

Be it known that I, WYNANT WITBECK, of the city of Troy, in the county of Rensselaer and State of New York, have invented certain new and useful Improvements in Box-Setters for Carriage-Wheels, of which the following embraces a full and exact description, reference being had to the accompanying drawings, in which—

Figure 1 is a side elevation and section, at the line $z\ z$ in Figs. 2 and 3, of a mechanism embodying my invention and holding a carriage-wheel; Fig. 2 a front elevation, and Fig. 3 a broken rear elevation, of a device for centering and clamping the wheels; Fig. 4, an end elevation of a sectional screw-socket for a boring-spindle, and Fig. 5 shows a boring-spindle on a larger scale than the other drawings; like parts being marked by the same letters in all the figures, and the arrows therein being indicative of the directions in which the contiguous parts are movable.

The general object of my invention is the production of a very cheap, durable, convenient and effective machine or apparatus, which can be generally made or purchased and used with profit in boring various sizes of wagon or carriage wheels to receive axle-boxes by common wheelwrights who carry on small shops for making or repairing wagons or wheeled vehicles.

One part of my invention relates to mechanism for centering wagon or carriage wheels of various sizes, and clamping or holding them stationary by their rims for the action of an endwise progressive rotary boring-spindle, in preparing the wheels to receive their axle-boxes; and this part of my invention consists in the combination of stationary supports or bearings A A A for one lateral side of the rims of the wheels; radial bars B B B, fitted to slide endwise in or upon stationary guides, and having lugs or jaws C C C for clamping the wheels by the cylindrical or outermost face of their rims; a partially rotary cam-ring, D, for simultaneously and equally moving the said bars radially inward, and stationary sockets E F for supporting an endwise progressive rotary boring-spindle, G, on both sides of the wheel, all in such a manner that upon placing a wagon or carriage wheel, Y, with a lateral side of its rim $x$ close against the said stationary supports or bearings A, and with the face or tread of the rim between the lugs or jaws C of the radial bars B, and then turning the said cam-ring D so that it will move the said bars radially inward as far as the rim of the wheel will allow, and there holding fast the said cam-ring, the wheel will be thereby so clamped, centered, and held by its rim, in respect to the supporting-sockets for the boring-spindle, that when the latter shall be inserted through the hub $w$ of the wheel and in the said sockets E F, as indicated in Fig. 1, and the spindle then turned so as to bore a round hole, $v$, Fig. 5, in or through the hub, such hole will be concentric with and perpendicular to the plane of the rim of the wheel, or as nearly so as is commonly required in wagon or carriage wheels to receive their axle-boxes.

The aforesaid part of my invention secures not only one or a portion, but all, of the following advantageous results, viz: First, by having the two sockets E F for supporting the boring-spindle on both sides of the wheel to be bored, such spindle is more easily, firmly, and uniformly held to its work in boring through the hub of the wheel than if the spindle were only supported by a socket on one side of the wheel; second, by having the lugs or jaws C clamp and center the wheel by the outer face of its rim the wheel does not need to be clamped so hard to hold it against the action of the boring-spindle, and is not so liable to be bored eccentric to its tread, as if the wheel were clamped and centered by lugs or jaws clamping its hub; third, by having the griping-jaws C and side-supports A, so as to hold the wheel stationary for the action of a rotary boring-spindle, the wheel is not so liable to get out of place, or does not require to be clamped so hard to keep it in place while being bored, and the holding devices do not need to be near so strong or expensive as would be required if the holding devices were all mounted so as to revolve with the wheel in boring the latter; fourth, by having fixed supports or bearings A for the side of the rims of the wheels to rest against the rim of the wheel is more surely and firmly held in a plane perpendicular to the axis of the sockets for the boring-spindle than if the supports or bearings for the side of the rims of the wheels were on the movable lugs C, by which the wheel is clamped, and all necessity and expense of having guides or ways to make those lugs move accurately in a plane perpendicular to the axis of the sockets for the boring-spindle is avoided; and, fifth, by having the clamping-lugs C on bars B, which are slid endwise radially in and out by the cam-ring D, the said lugs do not require any special guides or ways for themselves to make them clamp the rim of the wheel properly or move in and out radially, as would be necessary if the lugs were simply pivoted to bars and the bars pivoted to a loose collar in the place of the cam-ring D, so that by partly turning the collar the bars would be inclined to one side from direct radial lines, and thereby made to draw the lugs inward, as in some machines heretofore made for boring box-holes in wheels for vehicles.

In boring the hubs of wheels for vehicles to receive their axle-boxes, by using a boring-spindle that is mounted so as to simply revolve and at the same time move slowly endwise in fixed supporting-sockets on opposite sides of the wheel when held stationary to be bored, it is a common practice to bore the hole through the hub to different diameters in different parts, somewhat as indicated at $v$ in Fig. 5. This practice requires the cutting-tool of the boring-spindle to be frequently changed or readjusted radially, and it is, therefore, important that the cutting-tool should be so secured to the spindle that a workman can very quickly, easily, accurately, and firmly adjust and fasten the cutting-tool to make it cut or bore at various distances from the axis of the spindle; and to that end one part of my invention consists of a boring-spindle, G, mounted so as to turn on its axis, and at the same time move gradually endwise in supporting-sockets E F, with a cutting-tool, $h$, secured in a mortise or slot, $i$, Fig. 5, in the spindle and between the said supporting-sockets by means of a screw-nut, $j$, fitting on a male-screw, $k$, on the spindle and endwise against a loose ring, collar, or sleeve, $l$, around the said spindle, and between the said nut and the parts of the cutting-tool which project through and beyond the spindle on both sides thereof, as indicated in Fig. 5, so that the tool $h$ can be set to cut a hole of larger or smaller diameter by simply turning the nut $j$ on the spindle, so as to thereby loosen the collar $l$ and set free the cutting-tool, and next moving the cutter radially in or out to the desired position, and then turning the nut back, so as to thereby retighten the ring $l$ against the cutting-tool, and so that the nut $j$ and sleeve $l$ not only hold the cutting-tool, but also stiffen the spindle, so that the latter will be less liable to spring and let the tool cut too deep or too shallow than if the cutter were fastened to the spindle by a key or set-screw, as heretofore commonly practiced, and so that the sleeve $l$ not only serves as a washer between the nut and the cutting-tool, but may, when made sufficiently smaller in diameter than the nut, and of a suitable length in respect to the depth of the hole to be bored, as indicated in Fig. 5, allow the chips made by the cutter to clear themselves from the cutter and from the hole in the hub more freely than if the nut were screwed directly against the cutter, and also allow the nut to have a handle, $m$, which, without interfering with the passage of the cutting-tool through the hub, will enable a workman to turn the nut by its handle without a separate wrench.

In carrying the aforesaid parts of my invention into operation, I construct and secure together the aforesaid elements thereof in any suitable manner. Thus, for example, in the aforesaid drawings the stationary supports A are fastened to timbers U on one upright side of a workshop, and the spindle-socket E is on a standard, U', fastened to the floor of the shop. The bars B slide endwise in radial grooves $n\ n\ n$ in the rear side of the supports A, and the lugs C extend from the bars B through openings $o\ o\ o$ in those supports. The bars B are connected with the cam-ring D by pins or studs $p\ p\ p$ on the bars, and extended into slots $q\ q\ q$ in the cam-ring, and the latter is fitted to turn back and forth on a stationary hollow hub or journal, R, fast on the supports A and concentric with the sockets E F. The socket F is in a cap, H, which is fastened to the hub R, so as to hold the cam-ring D close to the sliding bars B, and thereby retain the latter in the grooves $n$, and keep the pins $p$ of the bars in the slots $q$ of the cam-ring.

The lugs C C C have radial screws $s\ s\ s$, which bear at their inner ends against the outer face of the rim of the wheel to be bored, and which can be readily turned and set with their inner ends concentric with and at various distances from the axis of the sockets E F for the boring-spindle.

The cam-ring D has a handle, $t$, by which a person can turn the ring, and thereby slide the bars B B B in and out radially to tighten and loosen the jaws C C C against and from the rim of the wheel; and a pawl, V, is pivoted to a stationary part, A, so that the pawl can be engaged with a ratchet, W, on the cam-ring to hold the latter fast when turned so as to make the lugs C C C gripe the wheel tightly.

The socket F has a round hole, and the socket E is a screw-nut, which engages with a screw, $k$, (clearly shown in Fig. 5,) on the boring-spindle, but there represented with a thread much too quick for general use in gradually moving the spindle endwise as the latter is revolved by its handle $r$, the socket E being in two parts, of which one, $y$, is hinged to the other, and secured (see Figs. 1 and 4) by a movable fastening, $a$, so that the socket can be opened and the spindle taken out sidewise, as in some box-setters heretofore made.

What I claim as my invention in machinery for boring wheels for vehicles to receive axle-boxes, and desire to secure by Letters Patent, is—

1. The combination of a cam-ring, D, and radially-sliding bars B B B, having lugs C C C, for griping a wheel by its rim, with fixed bearings A A A, for a side of the rim of the wheel, and central sockets, E F, for a rotary endwise-movable boring-spindle, substantially as herein described.

2. A boring-spindle, G, mounted in sockets E F, and having its cutter $h$ arranged between those sockets, and fastened in a slot or mortise, $i$, in the spindle by means of a sleeve, $l$, screw-nut, $j$, and screw $k$ on the spindle, substantially as herein set forth.

WYNANT WITBECK.

Witnesses:
JOHN MORAN,
AUSTIN F. PARK.